(12) United States Patent
Echizen et al.

(10) Patent No.: US 11,323,002 B2
(45) Date of Patent: May 3, 2022

(54) ROTARY ELECTRIC MACHINE

(71) Applicant: DENSO CORPORATION, Kariya (JP)

(72) Inventors: Masayuki Echizen, Kariya (JP); Seigo Shinoda, Kariya (JP)

(73) Assignee: DENSO CORPORATION, Kariya (JP)

(*) Notice: Subject to any disclaimer, the term of this patent is extended or adjusted under 35 U.S.C. 154(b) by 212 days.

(21) Appl. No.: 16/892,528

(22) Filed: Jun. 4, 2020

(65) Prior Publication Data

US 2021/0006118 A1  Jan. 7, 2021

(30) Foreign Application Priority Data

Jul. 3, 2019 (JP) .............................. JP2019-124685

(51) Int. Cl.
*H02K 3/52* (2006.01)
*H02K 11/21* (2016.01)
*H02K 1/14* (2006.01)
*H02K 3/28* (2006.01)

(52) U.S. Cl.
CPC ............. *H02K 3/522* (2013.01); *H02K 1/148* (2013.01); *H02K 3/28* (2013.01); *H02K 11/21* (2016.01); *H02K 2203/06* (2013.01); *H02K 2203/12* (2013.01)

(58) Field of Classification Search
CPC ..... H02K 3/522; H02K 2203/12; H02K 11/21
See application file for complete search history.

(56) References Cited

U.S. PATENT DOCUMENTS

| 10,916,976 | B2* | 2/2021 | Post ....................... H02K 3/325 |
| 2007/0182265 | A1 | 8/2007 | Makino et al. |
| 2010/0201213 | A1 | 8/2010 | Kataoka et al. |
| 2011/0221297 | A1* | 9/2011 | Langford ............. H02K 15/024 310/215 |
| 2014/0265653 | A1* | 9/2014 | Heins ..................... H02K 15/14 310/198 |
| 2018/0323663 | A1* | 11/2018 | Ogawa .................. H02K 1/145 |
| 2021/0006118 | A1* | 1/2021 | Echizen ................. H02K 11/21 |
| 2021/0384790 | A1* | 12/2021 | Echizen ................... H02K 1/27 |

OTHER PUBLICATIONS

U.S. Appl. No. 16/892,656, filed Jun. 4, 2020 in the name of Echizen, M. et al.

* cited by examiner

*Primary Examiner* — Robert W Horn
(74) *Attorney, Agent, or Firm* — Oliff PLC

(57) ABSTRACT

A rotary electric machine includes magnetic poles to which a coil is attached. A connection portion between a conductive member and a coil end of the coil is arranged in an inter-pole gap between the magnetic poles. The rotary electric machine may include a rotor and a stator. The magnetic poles may be magnetic poles of the stator.

14 Claims, 15 Drawing Sheets

US 11,323,002 B2

ROTARY ELECTRIC MACHINE

CROSS REFERENCE TO RELATED APPLICATION

This application is based on and incorporates herein by reference Japanese Patent Application No. 2018-233634 filed on Dec. 13, 2018 and Japanese Patent Application No. 2019-124685 filed on Jul. 3, 2019.

TECHNICAL FIELD

The disclosure in this specification relates to a rotary electric machine.

BACKGROUND

Conventionally, a rotary electric machine including multiple magnetic poles is known.

SUMMARY

According to at least one embodiment, a rotary electric machine includes magnetic poles to which a coil is attached. A connection portion between a conductive member and a coil end of the coil is arranged in an inter-pole gap between the magnetic poles.

BRIEF DESCRIPTION OF THE DRAWINGS

The details of one or more embodiments are set forth in the accompanying drawings and the description below. Other features and advantages will be apparent from the description and drawings, and from the claims.

DETAILED DESCRIPTION

Figure 1:
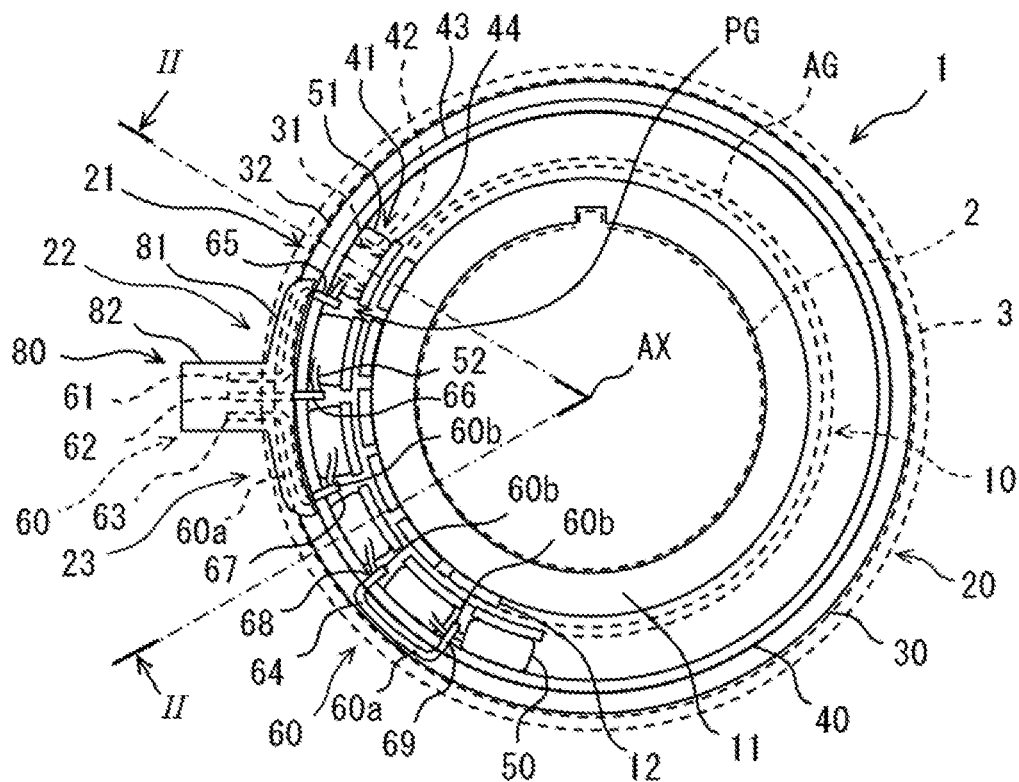
FIG. 1 is a plan view showing a rotary electric machine according to a first embodiment.

Comparative examples will be described. According to a comparative example, a rotary electric machine has a structure in which a lead wire of a stator coil is extended long from an axial end portion of the stator coil along the axial direction of the stator coil. According to another comparative example, a rotary electric machine has a structure in which a terminal block for a lead wire of a stator coil is further stacked in the axial direction on an axial end portion of the stator coil.

According to those comparative examples, a size of the rotary electric machine in the axial direction may be large.

According to an aspect of the present disclosure, a rotary electric machine includes magnetic poles to which a coil is attached. A connection portion between a conductive member and a coil end of the coil is arranged in an inter-pole gap between the magnetic poles.

According to the disclosed rotary electric machine, the connection portion between the conductive member and the coil end is arranged in the inter-pole gaps. Since the inter-pole gap is utilized for the connection portion, a compact rotary electric machine can be provided.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination. The contents of US 2010/0201213 A1 and US 2007/0182265 A1 are incorporated by reference as explanation of technical elements in this specification.

Hereinafter, a plurality of embodiments will be described with reference to the drawings. In some embodiments, parts which are functionally and/or structurally corresponding and/or associated are given the same reference numerals, or reference numerals with different hundreds digit or higher digits. For corresponding parts and/or associated parts, additional explanations can be made to the description of other embodiments.

First Embodiment

Figure 2:
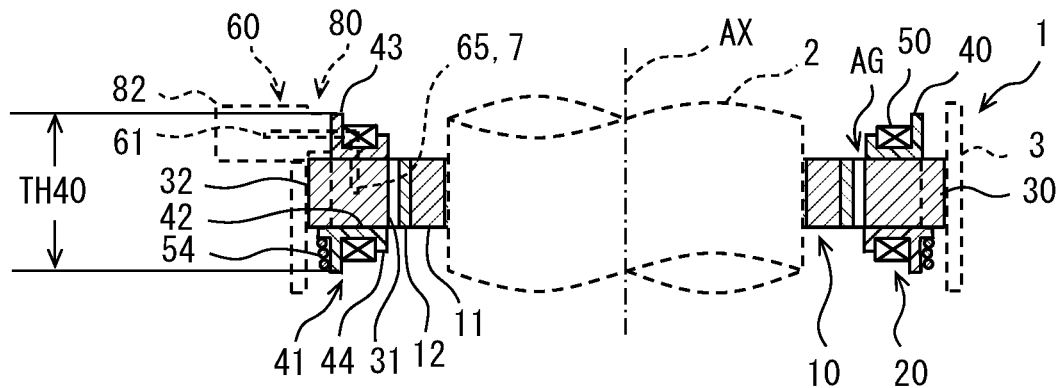
FIG. 2 is a cross-sectional view taken along a line II-II of FIG. 1.

FIGS. 1 and 2 show a rotary electric machine 1. In FIGS. 1 and 2, the rotary electric machine 1 is illustrated in a slightly exaggerated manner in radial direction. Dash lines indicate omissions or hidden lines. The rotary electric machine 1 is configured to rotate around a rotation axis AX. In the following descriptions, a direction in which the rotation axis AX extends is called an axial direction, a circumference around the rotation axis AX is called a circumferential direction, and a radiation direction centered at the rotation axis AX is called a radial direction.

In FIG. 1, the rotary electric machine 1 is coupled to a rotary body 2. The rotary body 2 is configured to rotate around the rotation axis AX. The rotary body 2 is a rotary shaft or an input/output end of a transmission. The rotary electric machine 1 is housed in a housing 3. The housing 3 provides a fixation portion for the rotating rotary electric machine 1.

The rotary electric machine 1 has a rotor 10 and a stator 20. The rotary electric machine 1 is an inner rotor type. The rotor 10 and the stator 20 are arranged so as to form an air gap AG therebetween. The rotor 10 is disposed outward of the rotary body 2 in the radial direction. The stator 20 is disposed further outward of the rotor 10 in the radial direction.

The rotor 10 includes a rotor core 11 and multiple rotor magnetic poles 12. The rotor core 11 is an annular magnetic body. The rotor core 11 is connected to the rotary body 2 in the rotation direction. The multiple rotor magnetic poles 12 are provided by permanent magnets. The multiple rotor magnetic poles 12 are arranged at equal intervals on an outer circumferential surface of the rotor core 11. As a result, the rotor 10 provides a permanent magnet rotor.

The stator 20 includes a stator core 30, an insulator 40 attached to the stator core 30, and a coil 50 attached to the insulator 40. The stator 20 provides multiple stator magnetic poles. In this embodiment, the stator 20 provides eighteen stator magnetic poles. In the drawings, a stator magnetic pole 21, a stator magnetic pole 22, and a stator magnetic pole 23 are illustrated for example. Each of these three stator magnetic poles 21, 22, 23 includes a corresponding phase winding. One stator magnetic pole includes one tooth 31, one bobbin 41 and one single coil 51.

These multiple stator magnetic poles define an inter-pole gap PG between two stator magnetic poles that are next to each other in the circumferential direction. The inter-pole gap PG is also called a circumferential gap or an inter-coil gap. The multiple inter-pole gaps PG have equal predetermined widths in the circumferential direction. The multiple inter-pole gaps PG are disposed at equal intervals in the circumferential direction. The inter-pole gap PG has a size that allows a connection portion described later to be arranged therein. The inter-pole gap PG has a size that allows a manufacturing operation for forming and arranging the connection portion to be performed. The size of the inter-pole gap PG can secure electrical insulation necessary as the rotary electric machine 1 between the connection portion described later and the coil 50.

The stator core 30 is, for example, a laminated body of electrical steel sheets. The stator core 30 includes multiple teeth 31. The stator core 30 includes a yoke 32. The yoke 32 is an annular magnetic body. The yoke 32 connects the multiple teeth 31 magnetically and mechanically. The multiple teeth 31 are arranged at equal intervals on an inner circumferential surface of the yoke 32. The multiple teeth 31 and the annular yoke 32 are a continuous body.

The insulator 40 is made of electrically insulating resin. The insulator 40 is a resin molded body. The insulator 40 includes multiple divided bodies divided in the axial direction. The multiple divided bodies are attached to the stator core 30 such that the insulator 40 is provided. The insulator 40 provides multiple bobbins 41 for the multiple teeth 31. One bobbin 41 is formed on one tooth 31. The bobbin 41 provides a winding drum for the coil 50. One bobbin 41 has a tubular portion 42 located radially outward of one tooth 31. One bobbin 41 provides a base end flange 43 at a base end of the tooth 31 and a top end flange 44 at a top end of the tooth 31. In other words, the tubular portion 42, the base end flange 43, and the top end flange 44 provide one bobbin 41.

The coil 50 provides a stator winding. The coil 50 provides a multi-phase winding. In this embodiment, the coil 50 provides a three phase winding. The insulator 40 is arranged between the coil 50 and the stator core 30. The coil 50 is arranged radially outward of the multiple teeth 31. The coil 50 includes multiple single coils 51. One single coil 51 is arranged radially outward of one tooth 31. The multiple single coils 51 are formed by winding wires around the bobbins 41. The wires are single wires made of copper or copper alloy. The wires have flexibility to allow winding work.

The stator magnetic pole 21 provides one phase winding of the three phase winding, for example, a U-phase winding. The stator magnetic pole 22 provides another phase winding of the three phase winding, for example, a V-phase winding. The stator magnetic pole 23 provides the remaining phase winding of the three phase winding, for example, a W-phase winding.

The stator 20 includes at least one conductive member 60. The stator 20 includes multiple conductive members 60. The conductive member 60 is also called a bus bar. The conductive member 60 has a cross-sectional shape different from that of the wire forming the coil 50. The wire has a circular cross section, but the conductive member 60 has a rectangular or square cross section. The conductive member 60 has flexibility. The flexibility of the conductive member 60 is lower than the flexibility of the wire. The conductive member 60 is harder and less likely to be deformed than the wire. Therefore, the conductive member 60 is a conductive member for electrically pulling out the wire of the coil 50 from the single coil 51.

The multiple conductive members 60 include power end members 61, 62, 63 and a neutral point member 64. The power end members 61, 62, 63 provide output terminals or input terminals as the three-phase winding. When the rotary electric machine 1 functions as a generator, the power end members 61, 62, 63 provide output terminals. When the rotary electric machine 1 functions as an electric motor, the power end members 61, 62, 63 provide input terminals. In this embodiment, the power end members 61, 62, 63 provide terminals of an electrical connector. The neutral point member 64 provides a neutral point connection as the three phase winding.

One conductive member 60 has at least one connection portion 65, 66, 67, 68, 69. In the following descriptions, one connection portion or multiple connection portions may be illustrated and described as a connection portion 7. The conductive member 60 is electrically and mechanically connected to at least one coil end 52 at the connection portion 65, 66, 67, 68, 69. The coil end 52 is an end portion of the coil 50. The stator 20 includes multiple coil ends 52. If the coil 50 provides a three-phase winding, the stator 20 has, for example, six coil ends 52.

The multiple power end members 61, 62, 63, respectively, have multiple connection portions 65, 66, 67 which are arranged, respectively, in three inter-pole gaps PG next to each other. The power end member 61 has a connection portion 65 arranged in a first inter-pole gap PG. The power end member 62 has a connection portion 66 arranged in a second inter-pole gap PG. The power end member 63 has a connection portion 67 arranged in a third inter-pole gap PG. The first to third inter-pole gaps PG are arranged next to each other. Each of the multiple connection portions 65, 66 and 67 is connected to a smallest number of coil ends 52. The smallest number is a number of a parallel number in the coil 50. In this embodiment, the smallest number is 1. When the coil 50 is provided by two parallel coils, the smallest number is 2.

The neutral point member 64 has multiple connection portions 68, 69 which are arranged, respectively, in the multiple inter-pole gaps PG next to each other. In an example illustrated in the drawings, the neutral point member 64 has two connection portions 68, 69 which are arranged, respectively, in two inter-pole gaps PG next to each other. The connection portion 68 is connected to the smallest number of coil ends 52. The connection portion 69 is connected to twice the smallest number of coil ends 52.

The multiple connection portions 65, 66, 67, 68, 69 are dispersively arranged in the multiple inter-pole gaps PG next to each other. The multiple connection portions 65, 66, 67, 68, 69 are arranged in the multiple inter-pole gaps PG next to each other, in a one-to-one relationship therebetween. In this embodiment, one connection portion is arranged in one inter-pole gap PG. As a result, the five connection portions 65, 66, 67, 68, 69 are arranged in the five inter-pole gaps PG next to each other.

The connection portions 65, 66, 67, 68, 69 are positioned in the inter-pole gaps PG. The connection portions 65, 66, 67, 68, 69 are positioned in the inter-pole gaps PG in the axial direction. A part of the conductive member 60 may extend out of the inter-pole gap PG in the axial direction. However, the connection portions 65, 66, 67, 68, 69 are entirely arranged in the inter-pole gaps PG. The connection portions 65, 66, 67, 68, 69 are positioned in the inter-pole gaps PG in the radial direction. A part of the conductive member 60 may extend out of the inter-pole gap PG in the radial direction. However, the connection portions 65, 66, 67, 68, 69 are entirely arranged in the inter-pole gaps PG.

Multiple magnetic poles protrude in the radial direction from the yoke 32 that extends in the circumferential direction. The multiple conductive members 60 include a circumferential extending portion 60a and a radial extending portion 60b. The circumferential extending portion 60a extends in the circumferential direction along the yoke 32. The radial extending portion 60b extends in the radial direction from the circumferential extending portion, and an end of the radial extending portion 60b reaches the inter-pole gap PG. The connection portions 65, 66, 67, 68, 69 are formed on the end of the radial extending portion 60b. For example, the power end members 61, 63 have the circumferential extending portion 60a and the radial extending portion 60b. The power end member 62 includes only the radial extending portion 60b. The power end members 61, 62, 63 include a radial extending portion extending inward toward the inter-pole gap PG for the connection portion, and a radial extending portion extending outward to be connected to an external circuit for external connection. The neutral point member 64 includes a circumferential extending portion 60a and two radial extending portions 60b.

The stator 20 includes a terminal block 80. The terminal block 80 is made of an electrically insulating resin. The terminal block 80 supports the multiple conductive members 60. The terminal block 80 supports the multiple power end members 61, 62, 63. The multiple power end members 61, 62, 63 are insert-molded on the terminal block 80. The terminal block 80 has a body portion 81 and a connector portion 82. The body portion 81 extends in an arc shape along the stator 20. The connector portion 82 is located outward of the body portion 81 in the radial direction and extends outward from the body portion 81 in the radial direction. The connector portion 82 is connected to a connector of an external circuit. The connector portion 82 provides a connection between the power end members 61, 62, 63 and the external circuit. The external circuit provides a control circuit for the rotary electric machine 1. The terminal block 80 is fixed to the stator 20. Specifically, the terminal block 80 is fixed to the insulator 40. The neutral point member 64 is supported by the insulator 40.

FIG. 2 shows a cross section taken along line II-II in FIG. 1. In this drawing, the position of the power end member 61 in the multiple conductive members 60 is illustrated by a relative positional relationship with the multiple stator magnetic poles. The multiple conductive members 60 are arranged similarly to the illustrated one. The drawing illustrates a crossover wire 54. The arrangement and the number of the crossover wires 54 are merely examples.

The multiple stator magnetic poles 21, 22, 23 include the insulator 40 as the bobbins 41. A height TH40 of the insulator 40 in the axial direction of the rotary electric machine 1 defines a height of the stator 20. In other words, the height TH40 of the insulator 40 defines a height of the rotary electric machine 1. The multiple conductive members 60 are arranged within the height TH40 of the insulator 40 in the axial direction.

The coil 50 includes the crossover wire 54 extending over the multiple single coils 51. The crossover wire 54 connects the multiple single coils 51 belonging to one phase winding by a continuous wire. In other words, the crossover wire 54 connects the multiple stator magnetic poles in the same phase by the continuous wire. In the case of three-phase winding, for example, the multiple single coils 51 belonging to the same phase, such as No. 1, No. 4, No. 7 . . . , are connected. The crossover wire 54 is laid along the insulator 40. The crossover wire 54 extends at least partially on an outer side of the base end flange 43 in the radial direction. The crossover wire 54 extends at least partially on an end portion in the axial direction which is opposite to an end portion in the axial direction where the terminal block 80 is arranged.

The power end member 61 extends in the radial direction in the connector portion 82 for external connection. The power end member 61 extends along the circumferential direction on the outer side of the base end flange 43 in the radial direction. The power end member 61 has a corner on an outer side of the first inter-pole gap PG in the radial direction. The power end member 61 extends across the base end flange 43 in the radial direction on the outer side of the first inter-pole gap PG in the radial direction. The power end member 61 extends in the first inter-pole gap PG in the axial direction. The connection portion 65 is positioned in the first inter-pole gaps PG. The connection portions 65 is positioned at the substantially center of the inter-pole gaps PG in the axial direction. The connection portions 65 is positioned at the substantially center of the inter-pole gaps PG in the radial direction.

The terminal block 80 is located outward of the base end flange 43 in the radial direction. The terminal block 80 is arranged at only one of opposite end portions of the rotary electric machine 1 in the axial direction. The connector portion 82 is located outward of the base end flange 43 in the radial direction. The connector portion 82 is exposed to an outside of the housing 3. The connector portion 82 has an opening facing outward in the radial direction in the outside of the housing 3. The connector portion 82 forms an electrical connection via the power end member 61 by receiving a connector of the external circuit moved along the radial direction from the outside in the radial direction.

Figure 3:
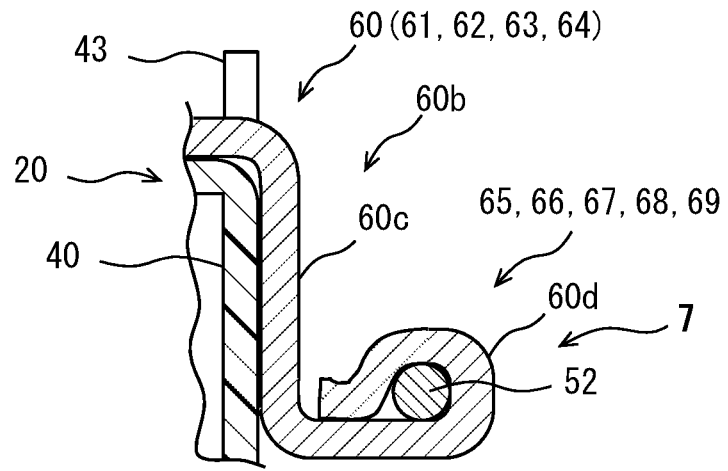
FIG. 3 is a cross-sectional view showing a connection portion of a conductive member.
Figure 4:
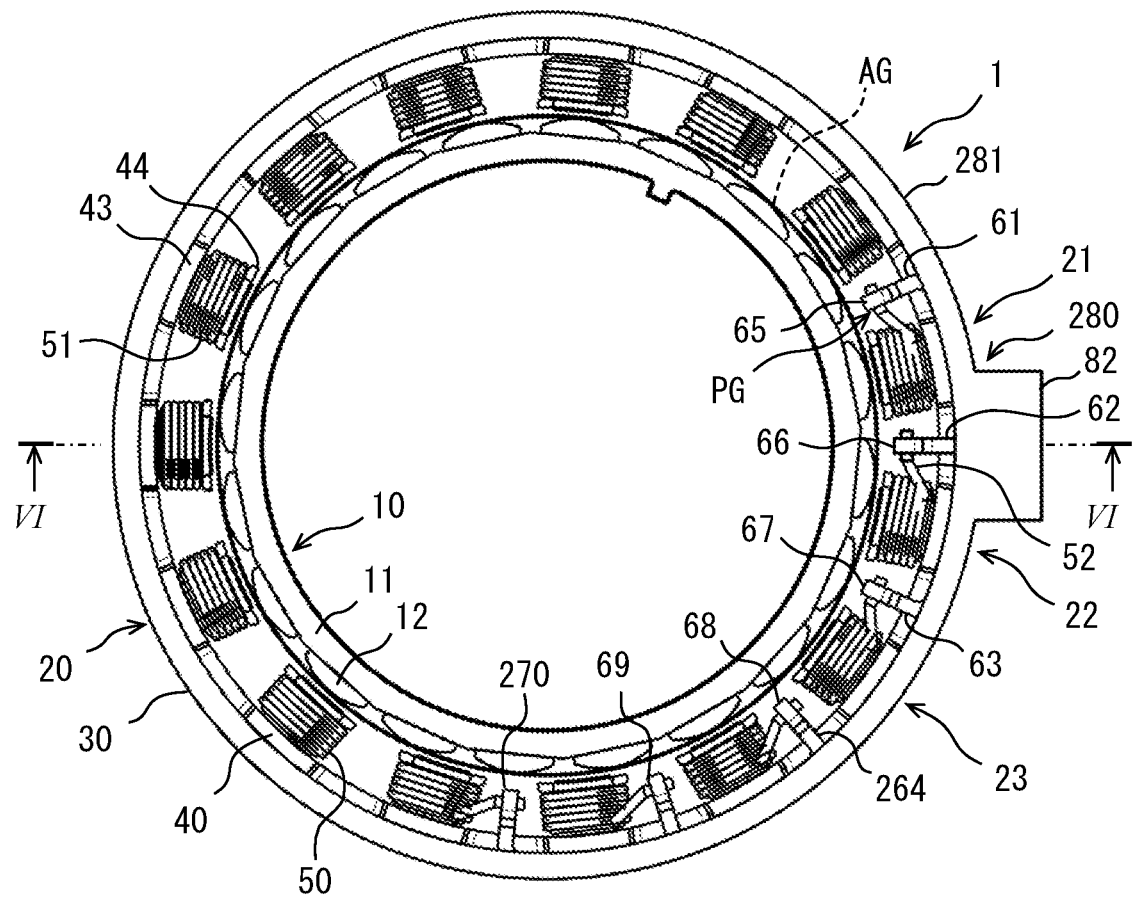
FIG. 4 is a plan view showing a rotary electric machine according to a second embodiment.
Figure 5:
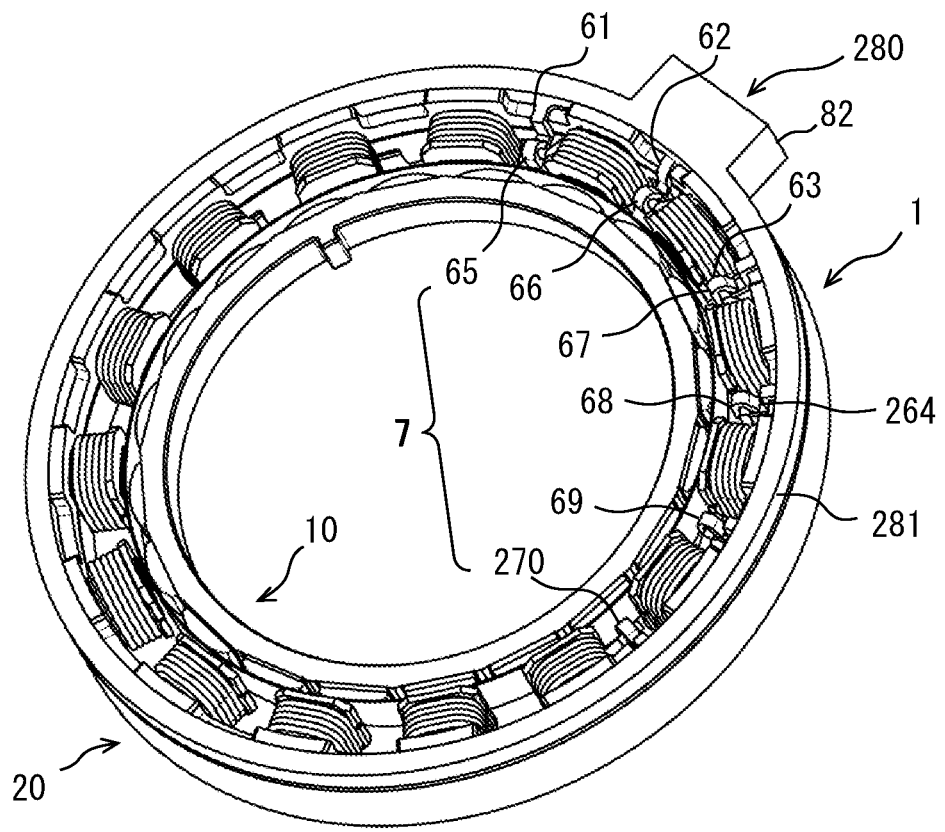
FIG. 5 is a perspective view showing a rotary electric machine.
Figure 6:
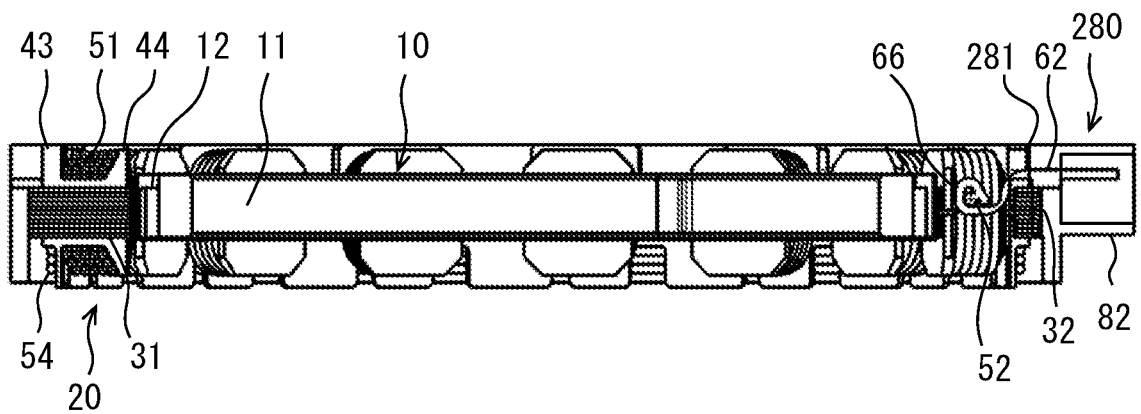
FIG. 6 is a cross-sectional view taken along a line VI-VI in FIG. 4.
Figure 7:
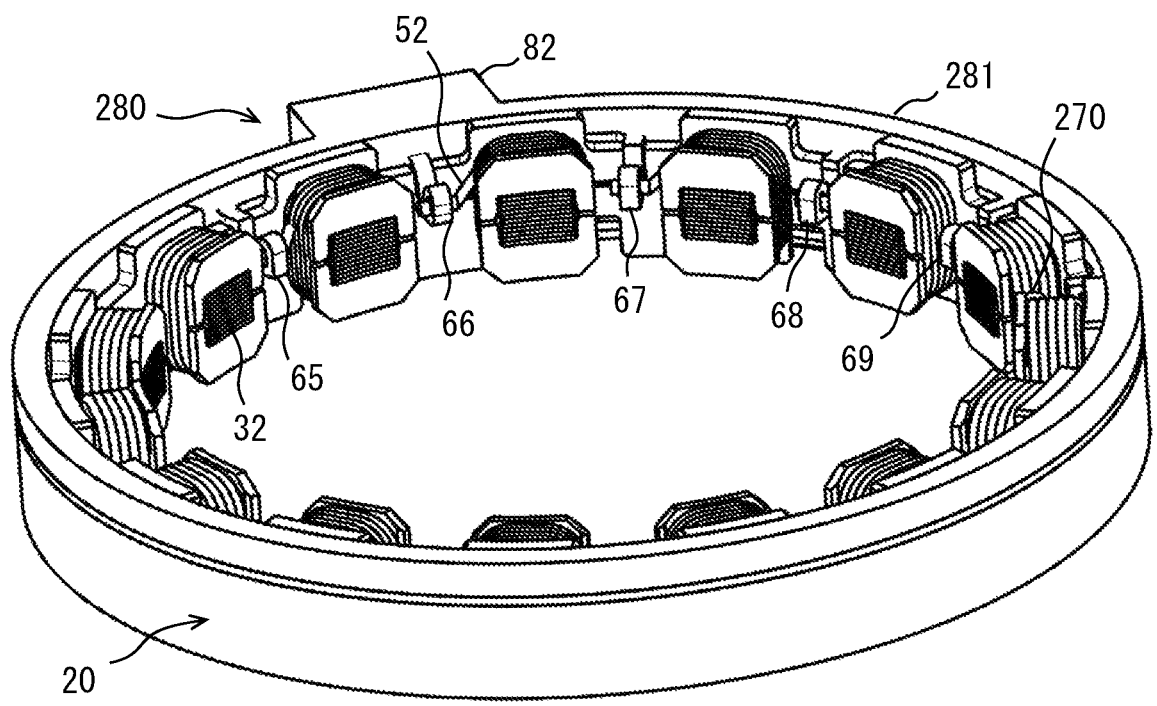
FIG. 7 is a perspective view showing a stator.

FIG. 3 is an enlarged view of the connection portion in FIG. 2. The multiple conductive members 60, that is, the multiple power end members 61, 62, 63 and the neutral point member 64 have similar shapes in the connection portions 65, 66, 67, 68, 69 provided by them. The conductive member 60 has a curved portion 60c and a joint portion 60d in the radial extending portion 60b. The curved portion 60c is a crank type that extends from an end surface of the stator 20 in the axial direction along a surface of the insulator 40 and further extends toward the inter-pole gap PG. The connection between the conductive member 60 and the coil end 52 is provided by fusing. The joint portion 60d that provides the connection by fusing is provided by the conductive member 60 being bent so as to wrap the coil end 52. The conductive member 60 and the coil end 52 are electrically and mechanically connected by fusing processing.

A method for manufacturing the rotary electric machine includes a step of assembling the rotor 10 and a step of assembling the stator 20. The step of assembling the stator 20 includes a step of assembling the stator core 30, a step of mounting the insulator 40 on the stator core 30, a step of winding the coil 50, and a step of forming the multiple connection portions 65, 66, 67, 68, 69. In the step of winding the coil 50, a winding machine is used to wind a wire around the stator core 30 with the insulator 40 so as to form the coil 50. This step can be carried out by one winding nozzle in sequence or by multiple winding nozzles in parallel.

In the step of forming the multiple connection portions 65, 66, 67, 68, 69, the multiple coil ends 52 are connected to the multiple conductive members 60. In this step, the conductive member 60 and the coil end 52 are electrically connected. This step can be performed in a manner: the conductive member 60 is arranged in the inter-pole gap PG; the coil end 52 is arranged so as to be in contact with the conductive member 60; the joint portion 60d is bent so as to wrap around the coil end 52; and fusing is performed. Alternatively, this step may be performed in a manner: the coil end 52 is arranged so as to be in contact with the conductive member 60 outside the inter-pole gap PG; the joint portion 60d is bent so as to wrap around the coil end 52; fusing is performed; and the conductive member 60 is arranged in the inter-pole gap PG.

Further, the method for manufacturing the rotary electric machine includes a step of fixing the multiple conductive members 60. This step can be performed before or after the step of forming the multiple connection portions. In this embodiment, the terminal block 80 positions and fixes the multiple power end members 61, 62, 63 at predetermined positions on the stator 20.

According to the embodiment described above, the connection portions 65, 66, 67, 68, 69 for the multiple coil ends 52 can be arranged in the inter-pole gaps PG. Therefore, miniaturization of the connection portions 65, 66, 67, 68, 69 for the coil ends 52 in the axial direction is achieved. According to this embodiment, the connection portions 65, 66, 67, 68, 69 can be easily manufactured. According to this embodiment, a rotary electric machine having a short length in the axial direction is provided.

Second Embodiment

This embodiment is a modification based on the preceding embodiment. In the above embodiment, the rotary electric machine 1 includes the neutral point member 64 and the arc-shaped terminal block 80. Instead, in this embodiment, a rotary electric machine 1 includes a multi-terminal neutral point member 264 and an annular terminal block 280. In this embodiment, the elements corresponding to those in the above-described embodiment are assigned with the same reference numerals. The descriptions of the above embodiment can be referred to for the descriptions of the elements assigned with the same reference numerals. In this embodiment, the rotary electric machine 1 includes a rotor 10 having 20 poles and a stator 20 having 15 poles.

Figure 8:
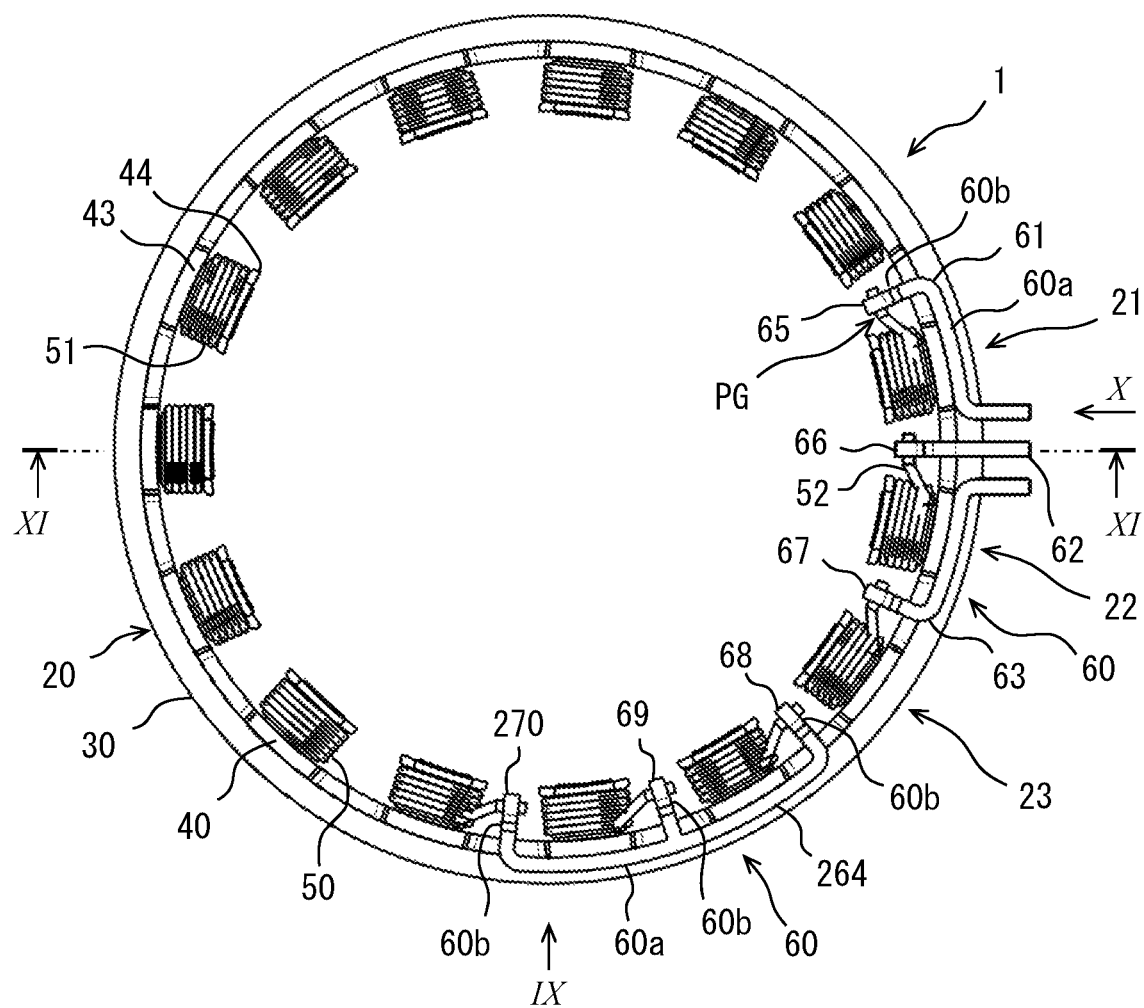
FIG. 8 is a plan view showing a terminal block excluding a stator core.

In FIGS. 4 to 11, particularly in FIG. 8, the neutral point member 264 has three connection portions 68, 69, 270. The neutral point member 264 provides three terminals for a three phase winding. The connection portion 68 provides electrical connection between a coil end of a first phase winding of the three phase winding and the neutral point member 264. The connection portion 69 provides electrical connection between a coil end of a second phase winding of the three phase winding and the neutral point member 264. The connection portion 270 provides electrical connection between a coil end of a third phase winding of the three phase winding and the neutral point member 264.

The multiple connection portions 65, 66, 67, 68, 69, 270 are dispersively arranged in the multiple inter-pole gaps PG next to each other. The multiple connection portions 65, 66, 67, 68, 69, 270 are arranged in the multiple inter-pole gaps PG next to each other, in a one-to-one relationship therebetween. In this embodiment, one connection portion is arranged in one inter-pole gap PG. As a result, the six connection portions 65, 66, 67, 68, 69, 270 are arranged in the six inter-pole gaps PG next to each other. Also in this embodiment, one connection portion or multiple connection portions may be illustrated and described as a connection portion 7. The neutral point member 264 has a shape that can be called a comb teeth type or a pitchfork type. The neutral point member 264 includes an arc portion that extends in the circumferential direction along a yoke 32 of a stator core 30, and radial portions that extends in the radial direction inward from the arc portion as a connection portion. The radial portions are disposed at equal intervals in the circumferential direction.

Also in this embodiment, the multiple conductive members 60 include a circumferential extending portion 60a and a radial extending portion 60b. For example, the power end members 61, 63 have the circumferential extending portion 60a and the radial extending portion 60b. The power end member 62 includes only the radial extending portion 60b. The neutral point member 264 includes a circumferential extending portion 60a and three radial extending portions 60b.

In the above-described embodiment, the terminal block 80 supports only the multiple power end members 61, 62, 63. The terminal block 80 does not support the neutral point member 64. In contrast, the terminal block 280 supports all of the multiple conductive members 60. The terminal block 280 supports both the multiple power end members 61, 62, 63 and the neutral point member 264. The multiple conductive members 60 are insert-molded on the terminal block 280.

In FIGS. 4 to 11, in particular FIGS. 4, 5, 6, and 7, the terminal block 280 has an annular shape. The terminal block 280 extends in the circumferential direction along the yoke 32. The terminal block 280 is located outward of the base end flange 43 in the radial direction. Also in this embodiment, the terminal block 280 provides a body portion 281 and a connector portion 82. The body portion 281 has an annular shape. The connector portion 82 is positioned at a part of the annular body portion 281.

Figure 9:
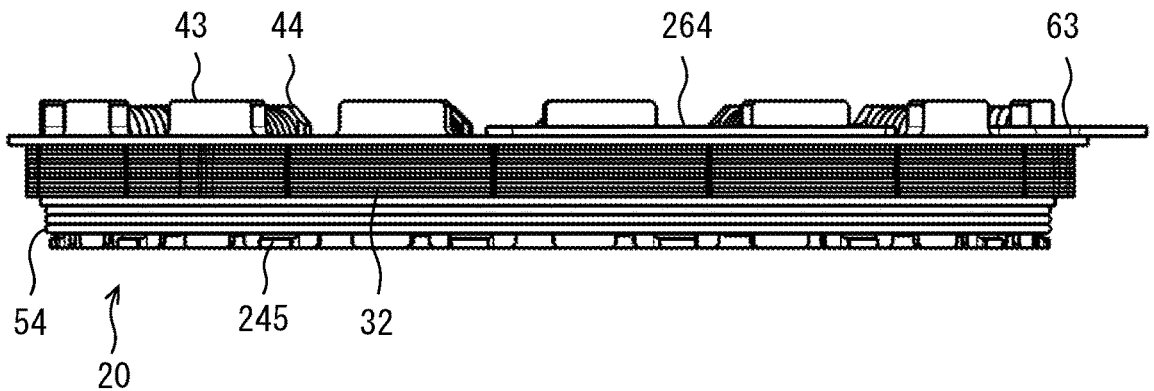
FIG. 9 is a side view in an arrow IX in FIG. 8.
Figure 10:
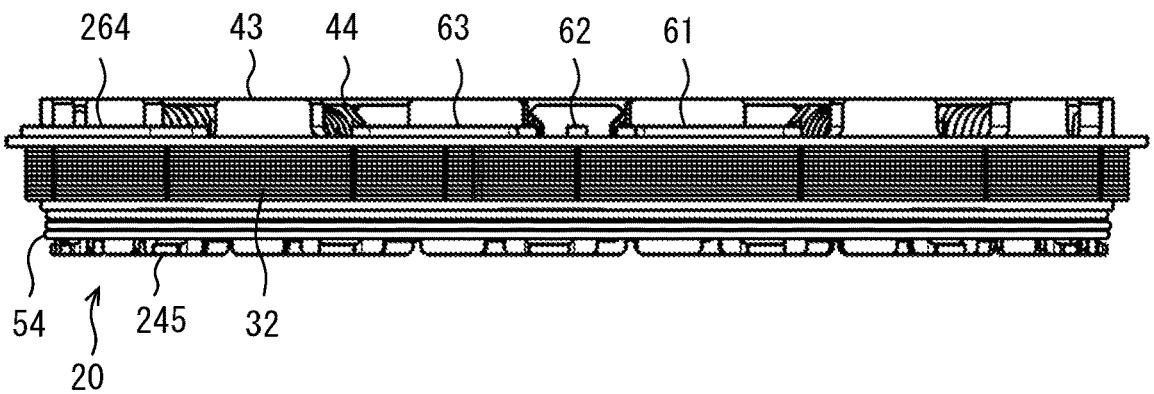
FIG. 10 is a side view in an arrow X in FIG. 8.
Figure 11:
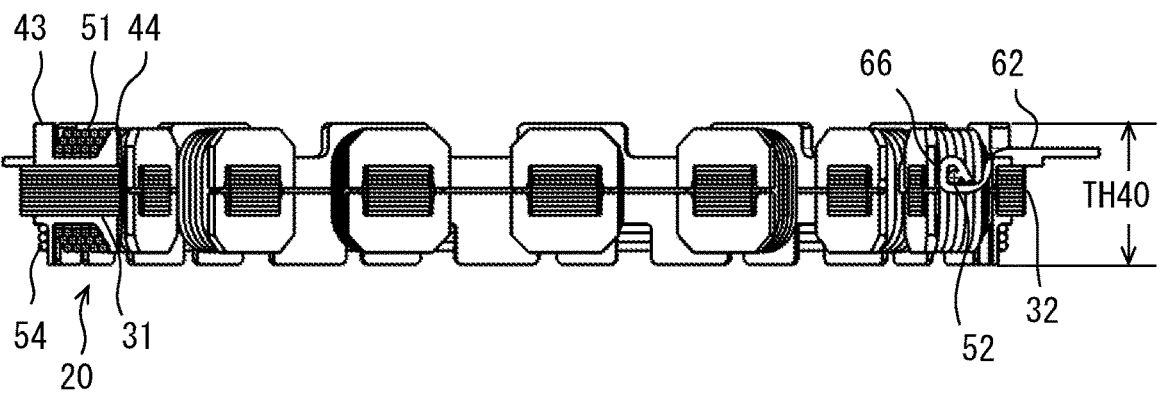
FIG. 11 is a cross-sectional view taken along a line XI-XI of FIG. 8.

As shown in FIGS. 9 and 10, an insulator 40 has a protrusion 245. The insulator 40 has multiple protrusions 245. The protrusion 245 further projects outward in the radial direction from a radially outer surface of an end portion of the base end flange 43 in the axial direction. The protrusion 245 functions as a stopper for positioning and holding multiple crossover wires 54 along the base end flange 43.

Also in this embodiment, the connection portions 65, 66, 67, 68, 69, 270 for the multiple coil ends 52 can be arranged in the inter-pole gaps PG. Therefore, miniaturization of the connection portions 65, 66, 67, 68, 69, 270 for the multiple coil ends 52 in the axial direction is achieved. According to this embodiment, the connection portions 65, 66, 67, 68, 69, 270 can be easily manufactured. According to this embodiment, a rotary electric machine having a short length in the axial direction is provided.

Third Embodiment

This embodiment is a modification based on the preceding embodiment. In the above embodiments, the conductive member 60 has a connector terminal. Alternatively, the conductive member 60 may be a press-fit electrode 360 that provides an electrical connection between multiple coil ends 52 and a circuit board. In this case, the joint portion 60d is provided by contact on a holding surface 360d.

Figure 12:
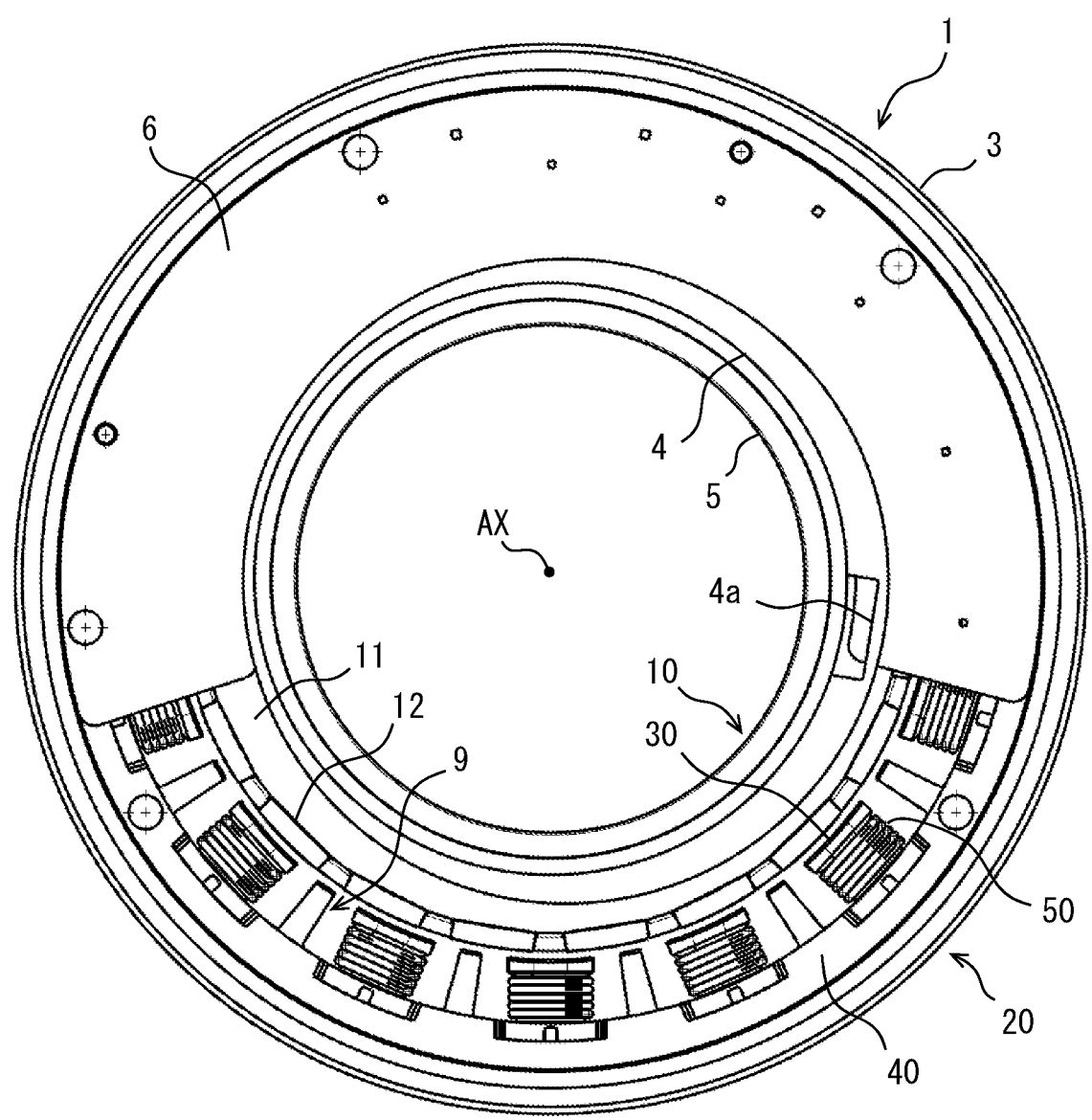
FIG. 12 is a plan view showing a rotary electric machine according to a third embodiment.

In FIG. 12, the rotary electric machine 1 has a rotor 10 and a stator 20. The rotor 10 includes a rotor core 11 and multiple rotor magnetic poles 12. The stator 20 includes a stator core 30, an insulator 40, and a coil 50. An end surface of the stator core 30 shown in the drawings is covered with the insulator 40. The numeral of the stator core 30 are assigned an end of a tooth.

The rotary electric machine 1 includes a housing 3 and a connection member 4. The connection member 4 functions as a part of the rotor 10, and mechanically connects the rotor 10 and a rotary body 2. The connection member 4 includes a connection groove 4a for connecting the rotor 10 and the rotary body 2 in a rotation direction of the rotary electric machine 1. The connection member 4 is rotatably supported by a bearing 5 together with the rotor 10. The rotary electric machine 1 includes a circuit board 6 that provides an electric circuit. The circuit board 6 is disposed on an end surface of the rotary electric machine 1. The circuit board 6 provides a part of a circuit for multiple power ends and/or a part of a circuit for a neutral point. Further, the circuit board 6 provides a part of a circuit for a rotational position detector of the rotary electric machine 1.

Figure 13:
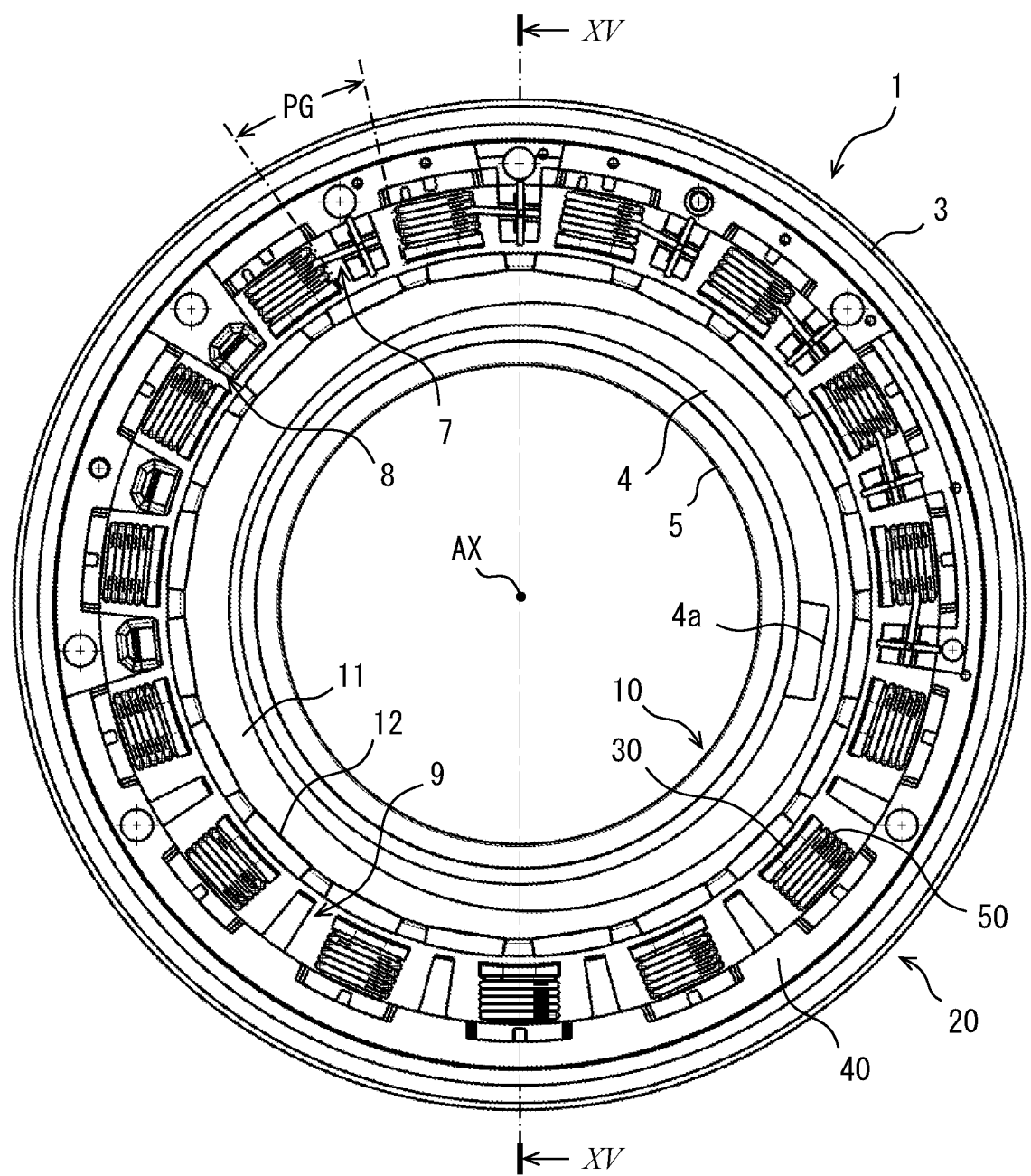
FIG. 13 is a plan view showing a rotary electric machine excluding a circuit board.

FIG. 13 shows a state in which the circuit board 6 has been removed. The stator 20 forms multiple inter-pole gaps PG. In this drawing, the inter-pole gap PG is illustrated as a range in the circumferential direction between two magnetic poles which are next to each other in the circumferential direction. The inter-pole gap PG is a gap between two single coils 51 which are next to each other in the circumferential direction. The inter-pole gap PG may be filled with a member arranged therein. Alternatively, the inter-pole gap PG may be filled with a cavity and a member arranged therein. Further alternatively, the inter-pole gap PG may be filled with a filling resin and a member arranged therein. One connection portion 7 is positioned in one of the multiple inter-pole gaps PG. The connection portion 7 provides an electrical connection between the coil end 52 and the conductive member 60. One rotational position detector 8 is positioned in another of the multiple inter-pole gaps PG. The rotational position detector 8 detects a rotational position of the rotary electric machine 1 and outputs an electric signal indicating the rotational position. One auxiliary magnetic pole 9 is positioned in another of the multiple inter-pole gaps PG. The auxiliary magnetic pole 9 assists rotation of the rotary electric machine 1.

Figure 14:
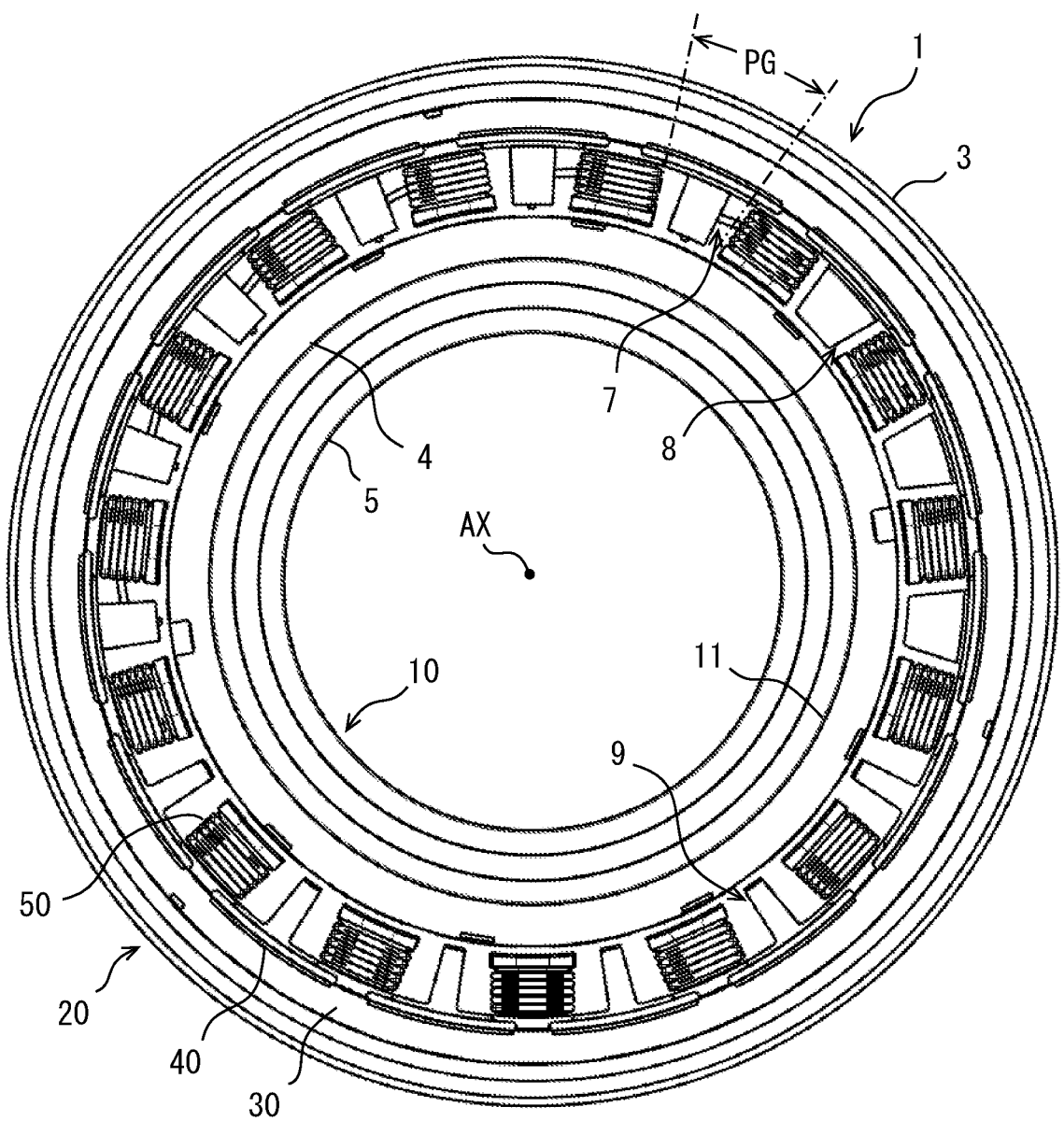
FIG. 14 is a plan view showing a back surface of a rotary electric machine.

FIG. 14 shows a back surface of the rotary electric machine 1. On the back surface of the rotary electric machine 1, an end surface of the stator core 30 is exposed in an annular shape. The numeral of the stator core 30 are assigned an annular yoke portion.

Figure 15:
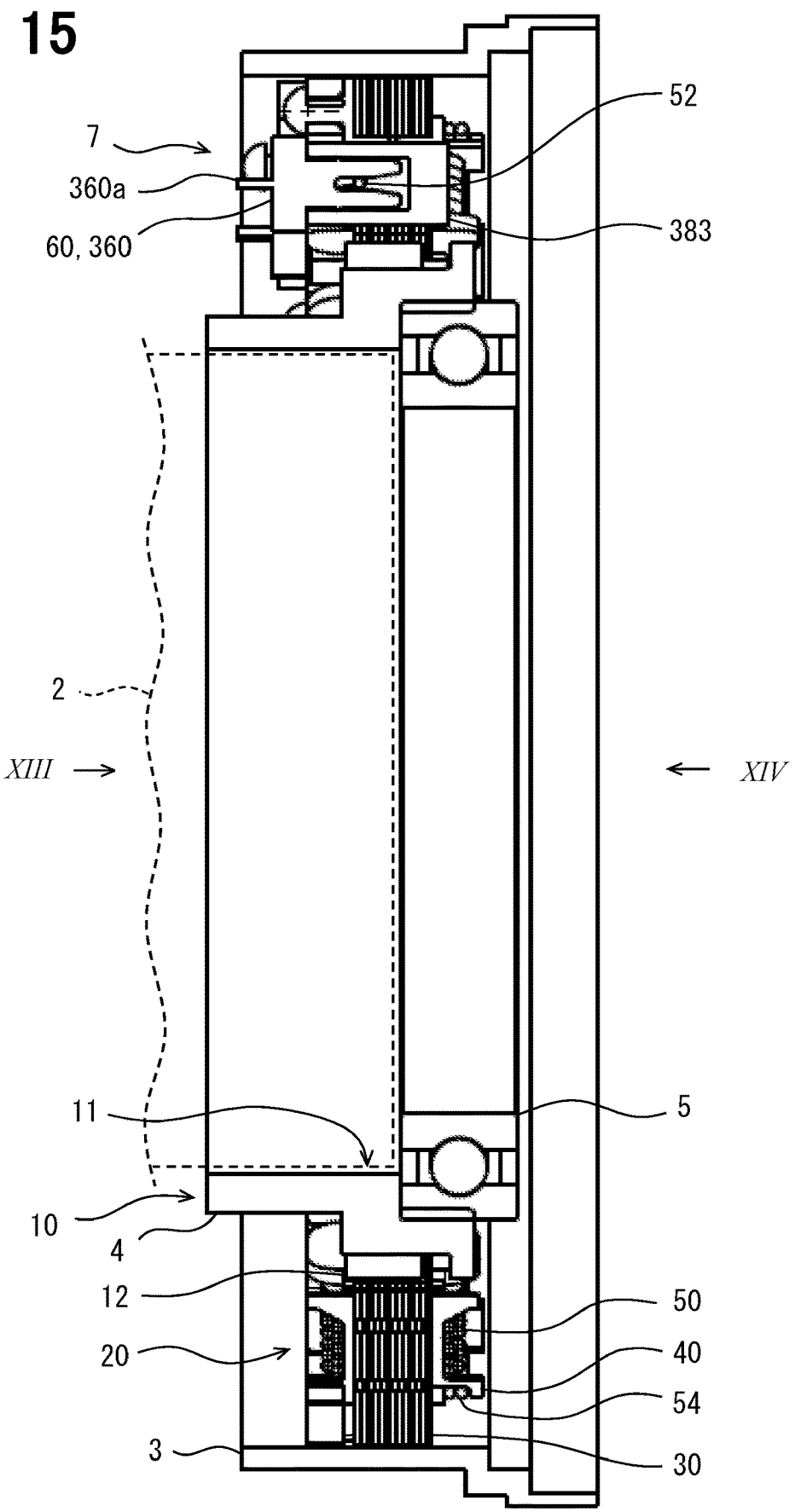
FIG. 15 is a cross-sectional view taken along a line XV-XV in FIG. 13.

In FIG. 15, the rotor core 11 and the connection member 4 are provided by a stepped tubular member. An inner surface of the tubular member is connected to the bearing 5. The tubular member is connected to an outer race of the bearing 5. The tubular member holds multiple rotor magnetic poles 12 on its outer surface.

The connection portion 7 includes a press-fit electrode 360 that provides the conductive member 60. The press-fit electrode 360 is electrically and mechanically connected to the coil end 52 by receiving the coil end 52. The press-fit electrode 360 is a single flat plate electrode. The press-fit electrode 360 is positioned such that the flat plate is substantially parallel to a plane extending in the axial direction and the radial direction of the rotary electric machine 1. The press-fit electrode 360 may be a three-dimensional electrode which has been three-dimensionally bent. Also in this case, a flat part of the press-fit electrode 360 is positioned so as to be substantially parallel to a plane extending in the axial direction and the radial direction of the rotary electric machine 1. The press-fit electrode 360 includes a terminal 360a. The terminal 360a extends outward from the press-fit electrode 360 in the axial direction of the rotary electric machine 1. The terminal 360a is electrically and mechanically connected to the circuit board 6. The terminal 360a and the circuit board 6 are electrically and mechanically connected by a method such as soldering or pressing contact.

Figure 16:
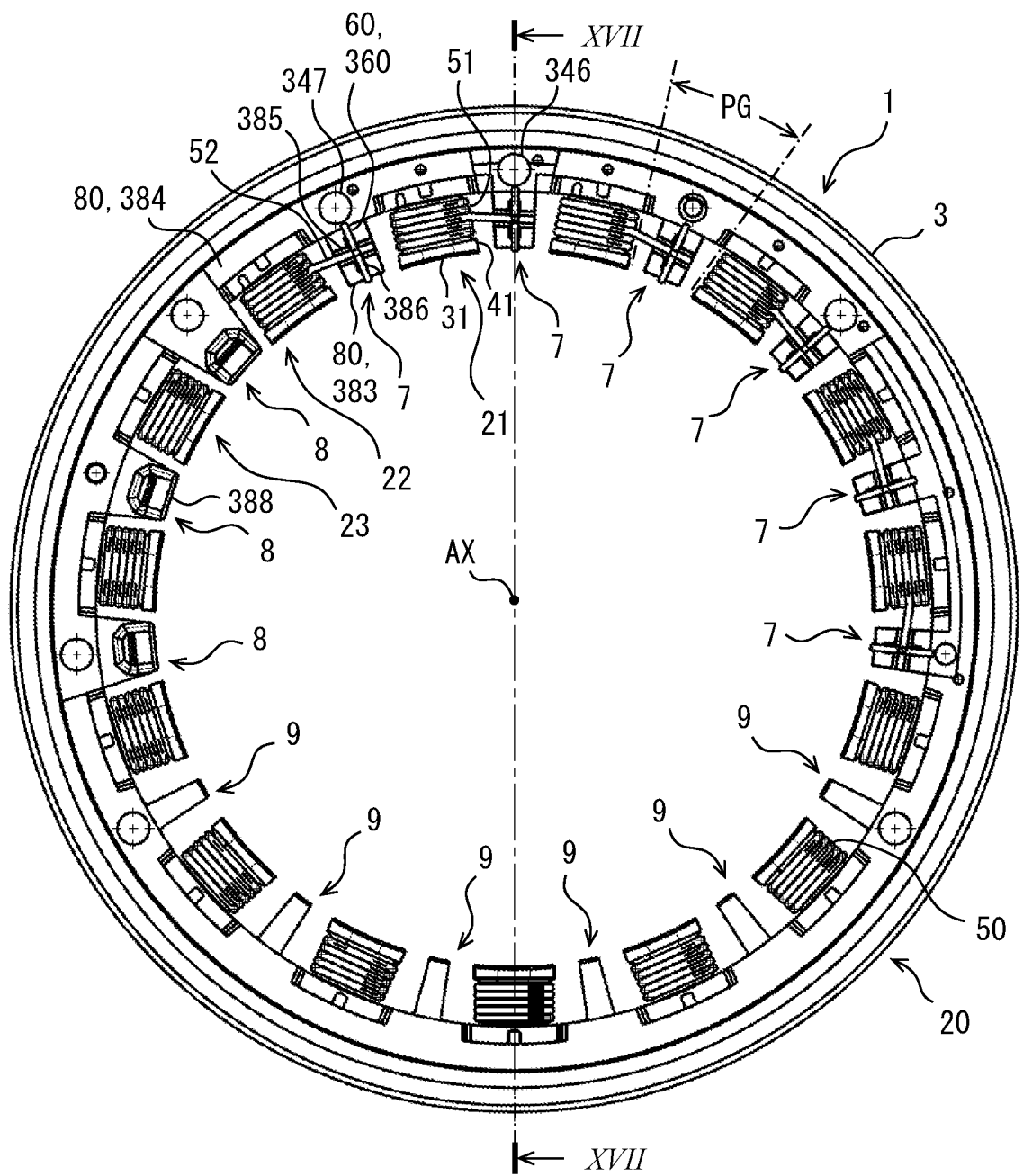
FIG. 16 is a plan view showing a stator core.

In FIG. 16, the stator 20 includes multiple connection portions 7. The stator 20 includes multiple rotational position detectors 8. The stator 20 includes multiple auxiliary magnetic poles 9. One connection portion 7 is positioned in one inter-pole gap PG in the circumferential direction. One rotational position detector 8 is positioned in one inter-pole gap PG in the circumferential direction. One auxiliary magnetic pole 9 is positioned in one inter-pole gap PG in the circumferential direction. The stator 20 forms multiple inter-pole gaps PG. One connection portion 7 is positioned in one of the multiple inter-pole gaps PG. One rotational position detector 8 is positioned in another of the multiple inter-pole gaps PG. One auxiliary magnetic pole 9 is positioned in another of the multiple inter-pole gaps PG. In other words, any one of the connection portion 7, the rotational position detector 8, or the auxiliary magnetic pole 9 is arranged in each of the multiple inter-pole gaps PG. The connection portion 7, the rotational position detector 8 and the auxiliary magnetic pole 9 do not overlap in the same inter-pole gap PG. In the illustrated embodiment, six connection portions 7 are arranged in six inter-pole gaps PG. Three rotational position detectors 8 are arranged in other three inter-pole gaps PG. Further, six auxiliary magnetic poles 9 are arranged in other six inter-pole gaps PG.

The stator 20 includes a terminal block 80. The terminal block 80 is a part of the insulator 40. The terminal block 80 is an electrically-insulating resin molded component. The terminal block 80 has a press-fit block 383. The terminal block 80 has multiple press-fit blocks 383 to provide the multiple connection portions 7. The terminal block 80 has a holding member 384 that supports the multiple press-fit blocks 383. The holding member 384 is an annular member that extends along a yoke 32 of the stator core 30. The holding member 384 is arranged on an end surface of the stator 20 in the axial direction. The press-fit block 383 is positioned so as to protrude from the holding member 384 in the radial direction. The press-fit block 383 protrudes inward from the holding member 384 in the radial direction. The press-fit block 383 is positioned so as to overlap the stator magnetic pole in the circumferential direction of the rotary electric machine 1. Therefore, the press-fit block 383 extends inward in the radial direction from the holding member 384 and extends between two magnetic poles which are adjacent in the circumferential direction. In other words, the press-fit block 383 extends inward from the holding member 384 in the radial direction like a cantilever. The press-fit block 383 and the holding member 384 are integrally molded from a continuous resin material.

The holding member 384 is connected to resin molded components that provide multiple bobbins 41. The resin molded components that provide the multiple bobbins 41 or the holding member 384 includes a connection mechanism for connecting each other. The connection mechanism can be provided by various means such as adhesion, engagement or welding. In this embodiment, the connection mechanism is provided by at least one welding pin. The resin molded components that provide the multiple bobbins 41 include multiple welding pins 346, 347. In this embodiment, the welding pins 346, 347 are arranged so as to extend in the axial direction from the resin molded components that provide the multiple bobbins 41. The multiple welding pins 346, 347 are partially deformed to fix the holding member 384. The welding pins 346, 347 are positioned so as to extend through the holding member 384. The welding pins 346, 347 are formed by melting and re-hardening the portions that extend through and project out from the holding member 384. The multiple welding pins 346, 347 integrally connect the holding member 384 and the resin molded components that provide the multiple bobbins 41.

The press-fit block 383 includes a holding groove 385. The holding groove 385 receives and holds the coil end 52. The holding groove 385 is a groove that extends long along the circumferential direction of the rotary electric machine 1. The holding groove 385 is a groove that has a depth along the axial direction of the rotary electric machine 1. The holding groove 385 is a trapezoidal groove in which a width gradually narrows from an opening end toward a bottom end. The holding groove 385 has a width at the opening end larger than a diameter of the coil end 52. The holding groove 385 has a width at the bottom end substantially the same as the diameter of the coil end 52. This "substantially the same" includes a range in which the coil end 52 can be practically held. Therefore, the holding groove 385 has, for example, a width that is slightly wider or slightly narrower than the diameter of the coil end 52 at the bottom end. The holding groove 385 may have, for example, a deformed portion that is deformed so as to fit the diameter of the coil end 52 by contact with the coil end 52 at the bottom end.

The press-fit block 383 includes an electrode groove 386. The electrode groove 386 receives and holds the press-fit electrode 360. The electrode groove 386 is a groove that extends long along the radial direction of the rotary electric machine 1. The electrode groove 386 is a groove that has a depth along the axial direction of the rotary electric machine 1. The electrode groove 386 is a groove in which a width is substantially the same from an opening end toward a bottom end. The electrode groove 386 receives the press-fit electrode 360 and limits excessive opening deformation of the press-fit electrode 360.

The stator 20 includes multiple press-fit electrodes 360. The multiple press-fit electrodes 360 is respectively arranged on the multiple press-fit blocks 383. The press-fit blocks 383 support the press-fit electrodes 360. The press-fit electrodes 360 are positioned radially with respect to the central axis AX of the rotary electric machine 1. The multiple press-fit blocks 383 form a substantially unitary member connected by the holding member 384, and consequently support the multiple press-fit electrodes 360. In the illustrated embodiment, three press-fit electrodes 360 provide three power end members. These press-fit electrodes 360 are electrically connected to an electrode end through the circuit board 6. The terminal block 80 provided by the multiple press-fit blocks 383 supports the multiple press-fit electrodes 360 as the multiple power end members. The remaining three press-fit electrodes 360 provide three neutral point members. These press-fit electrodes 360 are electrically connected to a neutral point through the circuit board 6. The terminal block 80 provided by the multiple press-fit blocks 383 supports the multiple press-fit electrodes 360 as the neutral point members. One press-fit electrode 360 has one connection portion 7, and one connection portion 7 is arranged in one inter-pole gap PG. Also in this embodiment, the multiple connection portions 7 are dispersively arranged in the multiple inter-pole gaps PG next to each other.

Since the press-fit electrode 360 is arranged in the electrode groove 386, the press-fit electrode 360 is positioned to be substantially parallel to the axial direction and the radial direction of the rotary electric machine 1. This "substantially parallel" includes a range in which the press-fit electrode 360 can be practically arranged in the inter-pole gap PG. The press-fit electrode 360 can be arranged, for example, in an inclination angle range of 0 to 45 degrees with respect to the radial direction. If the press-fit electrode 360 is sufficiently smaller than the inter-pole gap PG, the press-fit electrode 360 may be positioned to be substantially parallel to the axial direction and the circumferential direction of the rotary electric machine 1. The press-fit electrode 360 is positioned so as to divide the inter-pole gap PG into two halves in the circumferential direction.

The holding groove 385 and the electrode groove 386 are positioned such that the coil end 52 and the press-fit electrode 360 cross each other. More specifically, the holding groove 385 and the electrode groove 386 are positioned such that the coil end 52 and the press-fit electrode 360 cross each other at right angles. The crossing angle between the coil end 52 and the press-fit electrode 360 may be about 90 degrees (right angle). The crossing angle between the coil end 52 and the press-fit electrode 360 is adjustable within a range in which electrical connection can be stably obtained. The crossing angle between the coil end 52 and the press-fit electrode 360 may be changed, for example, in a range from 90 degrees to 30 degrees.

In this embodiment, the terminal block 80 includes a sensor housing cylinder 388 for providing the rotational position detector 8 as a configuration that can be selectively added, that is, as an optional component. The holding member 384 and the sensor housing cylinder 388 are integrally molded from a continuous resin material.

Figure 17:
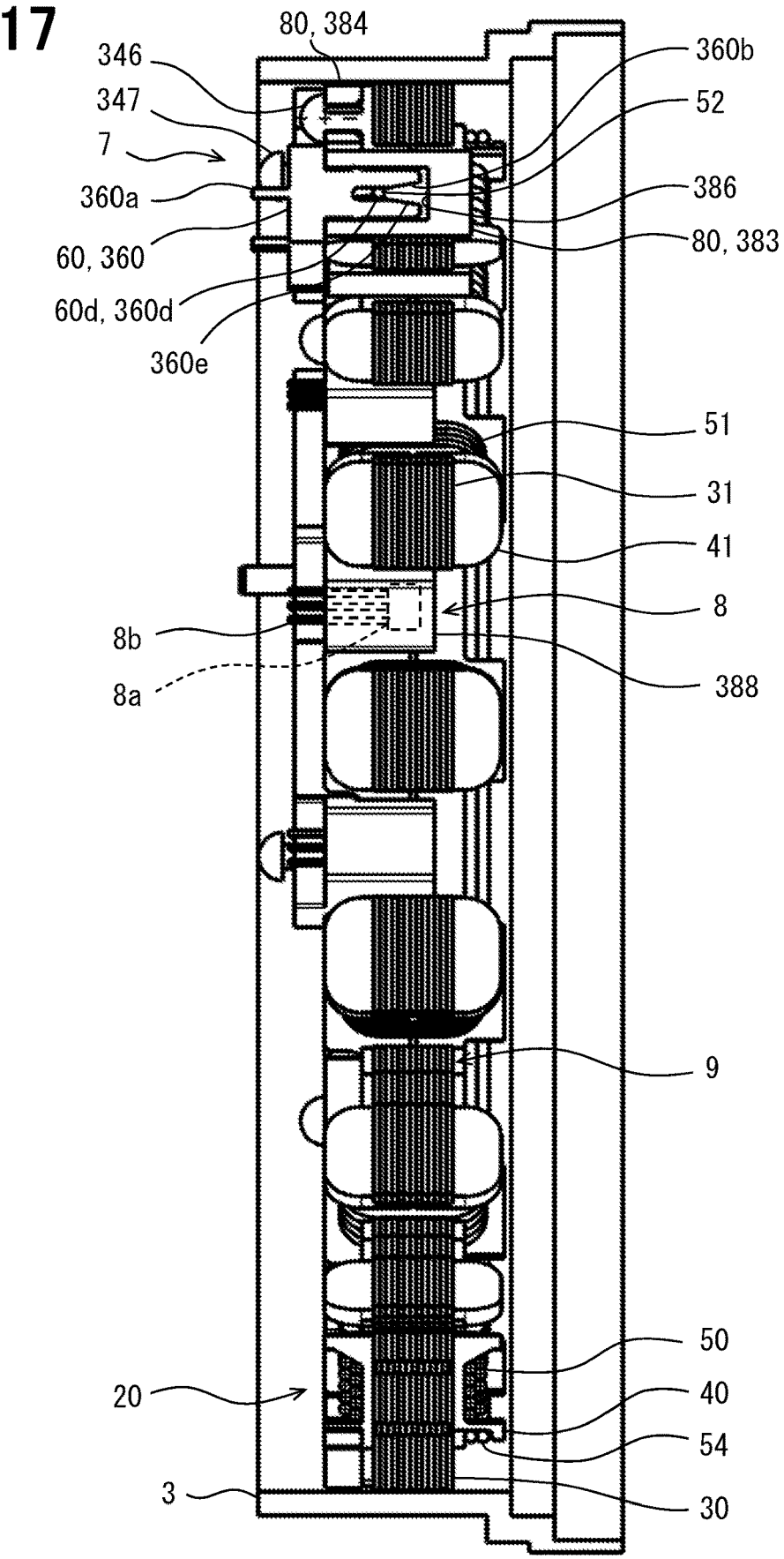
FIG. 17 is a cross sectional view taken along a line XVII-XVII in FIG. 16.

In FIG. 17, the stator core 30 is fixed to the housing 3. The housing 3 is provided by a stepped tubular member. The sensor housing cylinder 388 houses a position sensor 8a for detecting the rotational position. The position sensor 8a is, for example, a Hall effect element. The position sensor 8a is arranged so as to face the rotor magnetic pole 12. The position sensor 8a detects the rotational position of the rotor 10 by sensing a magnetic flux of the rotor magnetic pole 12. The position sensor 8a has a lead wire 8b. The lead wire 8b is connected to an electric circuit of the circuit board 6. In the subsequent figures, an enlarged view of the connection portion 7 is shown.

Figure 18:
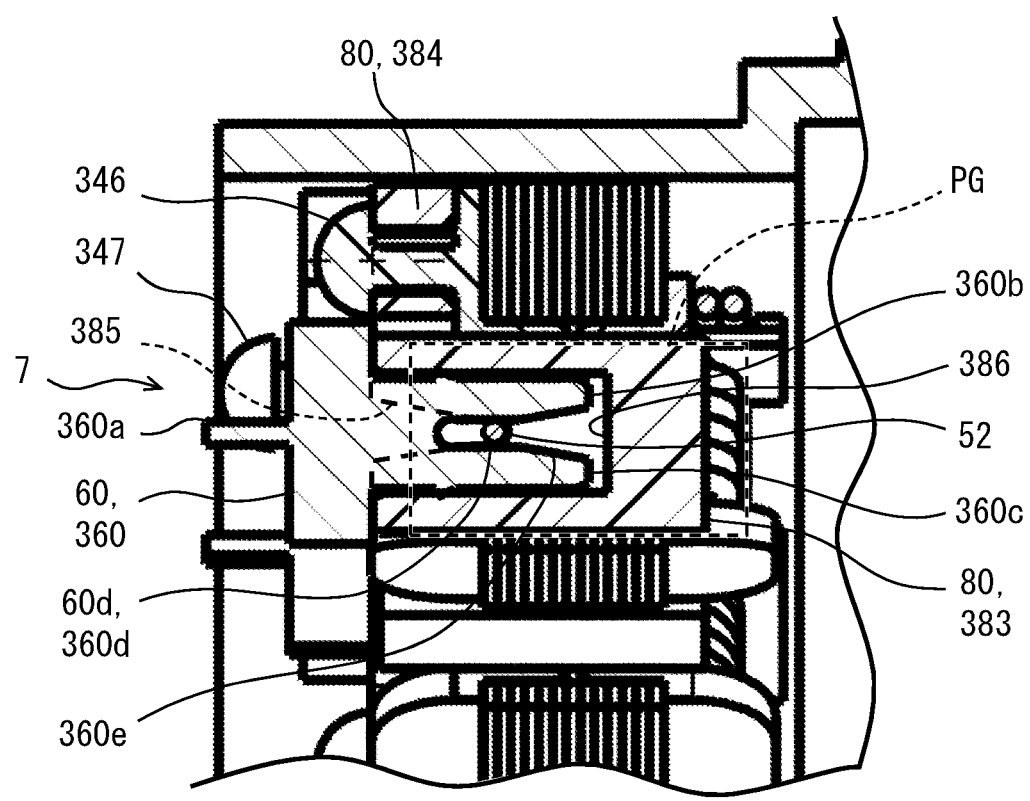
FIG. 18 is an enlarged cross-sectional view showing a connection portion including a press-fit electrode.

In FIG. 18, the connection portion 7 electrically and mechanically connects the coil end 52 and the press-fit electrode 360. Further, the press-fit electrode 360 is electrically and mechanically connected to the circuit board 6 (not shown) at the terminal 360a. The inter-pole gap PG corresponds to a rectangular range indicated by a dash line.

The connection portion 7 includes the coil end 52, the press-fit electrode 360, and the press-fit block 383. The coil end 52 extends from the single coil 51. The coil end 52 is positioned in the inter-pole gap PG. A part of the press-fit electrode 360 is located in the inter-pole gap PG, and is press-fitted to the coil end 52 in the inter-pole gap PG. The press-fit electrode 360 extends outward in the axial direction from the inter-pole gap PG. The press-fit electrode 360 functions as the conductive member 60. The press-fit block 383 functions as the terminal block 80. The coil end 52 is positioned at the bottom end of the holding groove 385. The holding groove 385 is a trapezoidal groove or a triangular groove having an inclined surface, as illustrated by a dash line. The press-fit electrode 360 includes a terminal 360a. The press-fit electrode 360 includes a pair of press-fit legs 360b, 360c. The pair of press-fit legs 360b, 360c extend substantially parallel to a body of the press-fit electrode 360. The pair of press-fit legs 360b, 360c therebetween form a guide surface 360e and a holding surface 360d. The guide surface 360e defines a groove that gradually narrows from an opening end. The holding surface 360d is located at the bottom end of the groove. The guide surface 360e guides the coil end 52 toward the holding surface 360d. In the process of the coil end 52 reaching the holding surface 360d from the guide surface 360e, an insulating film on a surface of the coil end 52 is peeled off. As a result, the contact between the coil end 52 and the holding surface 360d forms an electrical connection between the coil end 52 and the press-fit electrode 360. The holding surface 360d functions as the joint portion 60d.

The press-fit electrode 360 is located in the inter-pole gap PG in the circumferential direction of the rotary electric machine 1. The press-fit electrode 360 extends outward in the axial direction from the inter-pole gap PG. A part of the press-fit electrode 360 is located within a range of the stator core 30 in the axial direction of the rotary electric machine 1. In other words, the part of the press-fit electrode 360 is positioned to overlap with the stator core 30 in the axial direction of the rotary electric machine 1. A part of the press-fit electrode 360 is located in the inter-pole gap PG in both the circumferential direction and the axial direction of the rotary electric machine 1.

Figure 19:
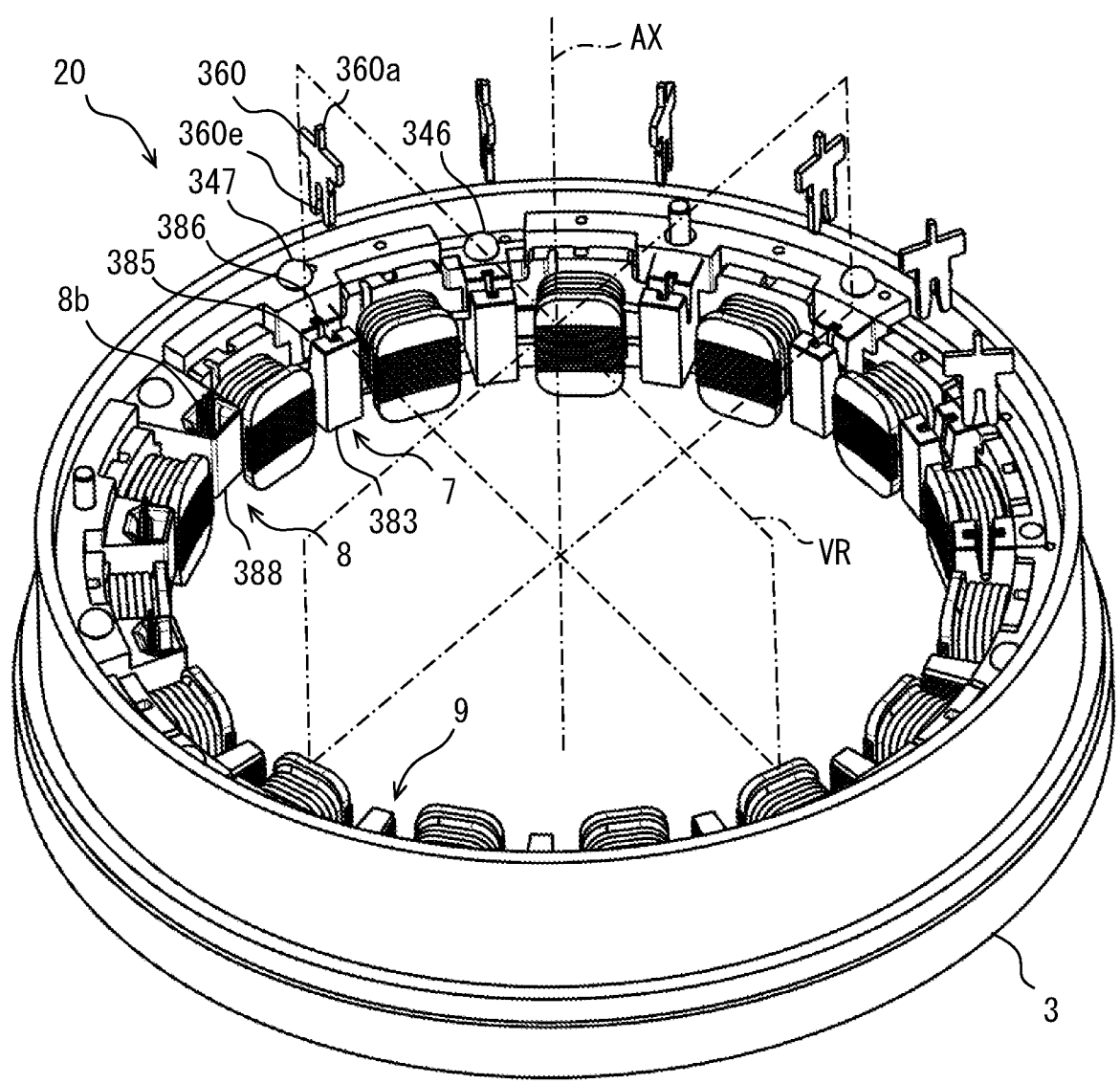
FIG. 19 is a partially exploded perspective view showing a stator.

In FIG. 19, a disassembled state of the press-fit electrode 360 is illustrated. The multiple press-fit electrodes 360 have a shape that can be inserted into the press-fit blocks 383 along the axial direction of the rotary electric machine 1. The multiple press-fit electrodes 360 are arranged to be insertable into the press-fit blocks 383 along the axial direction of the rotary electric machine 1. Further, the multiple press-fit electrodes 360 are positioned so as to spread in the radial direction. In other words, the multiple press-fit electrodes 360 are positioned so as to provide a surface spreading in the axial direction and the radial direction of the rotary electric machine 1. Virtual radiation surfaces VR can be assumed based on the central axis AX of the rotary electric machine 1, and the virtual radiation surfaces VR radially extend with respect to the central axis AX. The multiple press-fit electrodes 360 are arranged substantially parallel to the virtual radiation surfaces VR. This "substantially parallel" includes an allowable range under a condition that a distance between the press-fit electrode 360 and the coil 50 is secured. The press-fit electrodes 360 may be, for example, positioned with a roll angle, a pitch angle, and a yaw angle of from 0 to 30 degrees with respect to the virtual radiation surfaces VR.

Figure 20:
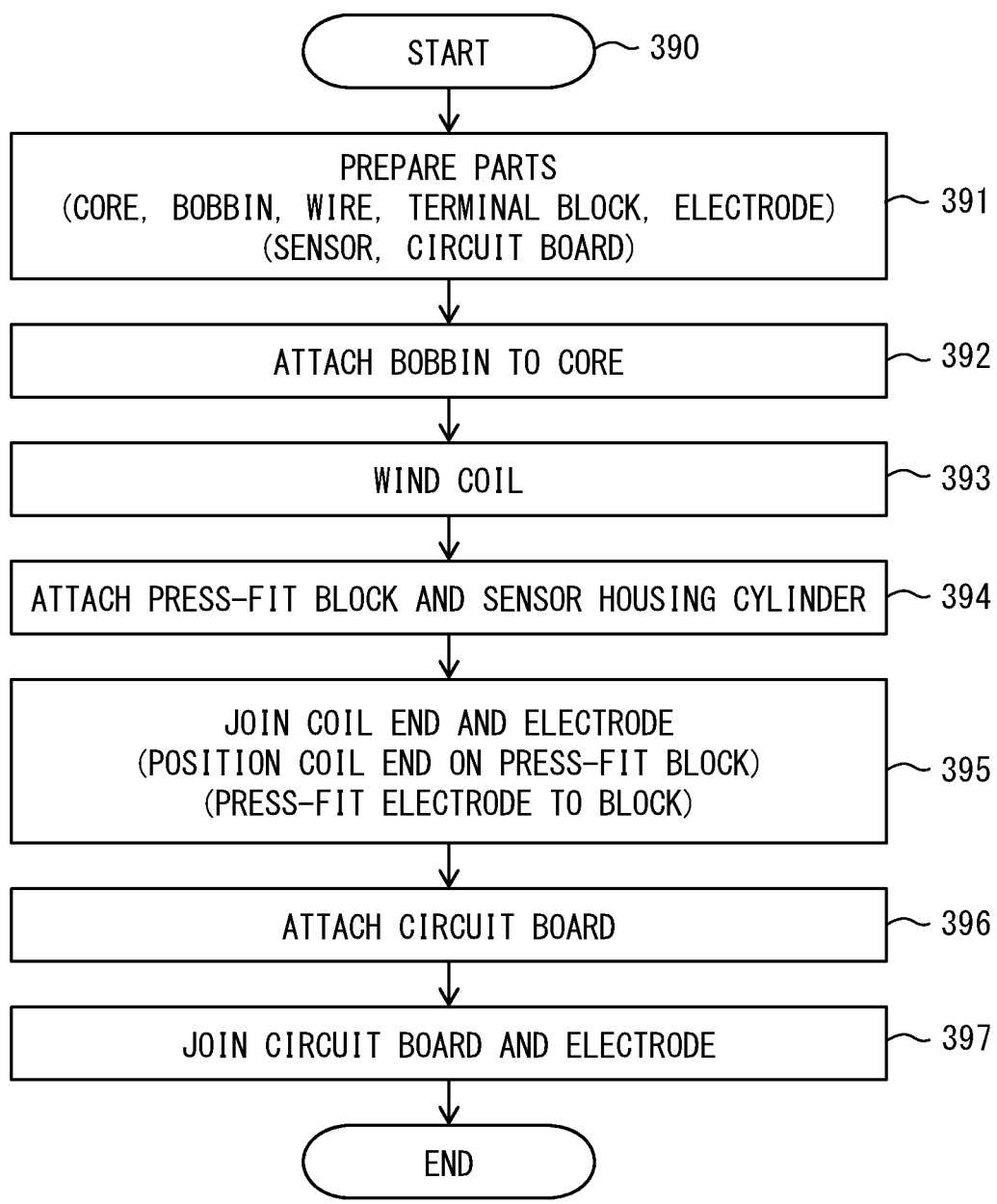
FIG. 20 is a flowchart showing a method for manufacturing a rotary electric machine.

In FIG. 20, a method for manufacturing the rotary electric machine includes a step of assembling the rotor 10 and a step 390 of assembling the stator 20. The step 390 of assembling the stator 20 includes steps 391 to 397. The manufacturing method includes step 391 of preparing multiple parts for the stator 20. At this step, the stator core 30, the bobbin 41, the electric wires for the coil 50, the terminal block 80, and the multiple press-fit electrodes 360 are prepared. Further, the multiple position sensors 8a and the circuit board 6 are prepared. The manufacturing method includes step 392 of attaching the bobbin 41 to the stator core 30. At this step, the insulator 40 for the bobbin 41 is attached to the stator core 30. The manufacturing method includes step 393 of winding the coil 50 on the bobbin 41. The auxiliary magnetic pole 9 is thinner than the press-fit block 383 and the sensor housing cylinder 388. Therefore, the coil 50 is wound while avoiding the auxiliary magnetic pole 9.

The manufacturing method includes step 394 of attaching the press-fit block 383 and the sensor housing cylinder 388 after the coil 50 is wound. The press-fit block 383 and the sensor housing cylinder 388 are attached by connecting the annular holding member 384 via the welding pins 346, 347. The manufacturing method includes step 395 of joining the coil end 52 and the press-fit electrode 360. This step includes a step of positioning the coil end 52 in the holding groove 385 of the press-fit block 383. Further, this step includes a step of press-fitting the press-fit electrode 360 to the press-fit block 383. As a result, the coil end 52 is pushed from the guide surface 360e into the holding surface 360d. At the same time, a fresh metal surface is exposed on the surface of the coil end 52 and comes into contact with the press-fit electrode 360, whereby the joining of the coil end 52 and the press-fit electrode 360 is completed. The press-fit electrode 360 provides a stable electrical connection by positioning of the coil end 52 on the holding surface 360d.

The manufacturing method includes step 396 of attaching the circuit board 6. At this step, the position sensor 8a is inserted into the sensor housing cylinder 388. At the same time, the lead wire 8b and the circuit board 6 are electrically connected by means such as soldering. The manufacturing method includes step of connecting the circuit board 6 and the multiple press-fit electrodes 360 at the terminals 360a. The circuit board 6 and the multiple terminals 360a are electrically connected by means such as soldering.

Furthermore, the manufacturing method of the rotary electric machine includes step of assembling the rotary electric machine 1 by arranging the rotor 10 and the stator 20 in a prescribed positional relationship. Finally, manufacturing of the rotary electric machine 1 is completed.

According to this embodiment, the connection portion 7 including the press-fit electrode 360 as the conductive member 60 is provided. In the connection portion 7, at least a part of the press-fit electrode 360 is arranged in the inter-pole gap PG. By utilizing the inter-pole gap PG, the length of the rotary electric machine 1 in the axial direction is reduced. In the connection portion 7, the coil end 52 is entirely arranged in the inter-pole gap PG, so that the length of the rotary electric machine 1 in the axial direction is reduced. Further, the press-fit electrodes 360 are radially positioned. Therefore, the inter-pole gaps PG are effectively utilized.

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional portions which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment.

In the above embodiments, the rotary electric machine 1 is an inner rotor type. Alternatively, the rotary electric machine 1 may be an outer rotor type. In the above embodiments, the rotary electric machine 1 provides an electric motor. Alternatively, the rotary electric machine 1 may provide a generator or a generator motor. Further, the rotary electric machine 1 can be used for various purposes such as a servo motor and a step motor.

In the above embodiments, the stator core 30 is provided by a steel plate in which the multiple teeth 31 and the yoke 32 are continuous. Alternatively, the stator core 30 may be provided by a so-called multi-split core. In this case, the stator core 30 is provided by a connected body of multiple partial cores. For example, one partial core is provided by a continuous body of one partial-annular partial yoke and one tooth.

In the above embodiments, the multiple conductive members 60 are insert-molded on the terminal blocks 80, 280. Alternatively, the multiple conductive members 60 may be press-fitted and fixed to the terminal blocks 80, 280. Further, the multiple conductive members 60 may be supported by or fixed to the insulator 40 without the terminal blocks 80, 280. For example, the multiple conductive members 60 may be directly fixed to the insulator 40 by snap fitting. Also in this configuration, since the connection portions 65, 66, 67, 68, 69, 270 are arranged in the inter-pole gaps PG, the physical size of the coil end 52 of the rotary electric machine 1 can be reduced. In the above embodiments, the connector portion 82 has an opening facing outward in the radial direction in the outside of the housing 3. Alternatively, the connector portion 82 may have an opening facing in the axial direction outside the housing 3. In this case, the connector portion 82 forms an electrical connection by receiving a connector of the external circuit moved along either of the axial directions.

In the above embodiments, the coil 50 is provided by star connection. Alternatively, the coil 50 may be provided by delta connection. In this case, the connection portion between one conductive member 60 and at least two coil ends 52 is arranged in the inter-pole gap PG. Further, in the above embodiments, one phase winding is provided by one wire. Alternatively, one phase winding may be provided by multiple wires as a parallel circuit. In this case, one single coil 51 is provided by the parallel circuit of the multiple wires. For example, when one single coil 51 is provided by two wires, a connection portion between the conductive member 60 that provides one power terminal and two coil ends 52, in the star connection, is arranged in the inter-pole gap PG. For example, when one single coil 51 is provided by two wires, a connection portion between the conductive member 60 that provides one power terminal and four coil ends 52, in the delta connection, is arranged in the inter-pole gap PG.

In the above embodiments, the conductive member 60 is a bus bar. Alternatively, the conductive member 60 may be an electrode for a terminal, a lead wire, or a conductor foil on a substrate. Also in these cases, since the connection portion is arranged in the inter-pole gap PG, miniaturization can be achieved. In the above embodiments, the coil 50 is made of copper or a copper alloy. Alternatively, the coil 50 may be made of aluminum or aluminum alloy. In the above embodiments, the connection between the conductive member and the coil end 52 is provided by fusing. Alternatively, the connection between the conductive member and the coil end 52 may be provided by heat staking, welding, soldering, for example.

In the above embodiments, the conductive member 60 has the connector terminal extending in the radial direction as the power end. Alternatively, the conductive member 60 may extend along the axial direction. Also in this cases, since the connection portion is arranged in the inter-pole gap PG, miniaturization in the axial direction can be achieved. In the above embodiments, the multiple power end members 61, 62, 63 provide connector terminals. Alternatively, the power end members 61, 62, 63 may provide press-fit terminals, solder terminals, for example.

In the above embodiments, the inter-pole gap PG is a cavity. Alternatively, the inter-pole gap PG may be filled with a resin member after disposing the conductive member 60. Further, the conductive member 60 arranged in the inter-pole gap PG may be coated with a thin resin material. In any configuration, the connection portion which is a part of the conductive member 60 is disposed in the inter-pole gap PG. Thus, the miniaturized rotary electric machine 1 is provided.

In the above embodiments, the multiple coil ends at winding start are used the power ends, and the multiple coil ends at winding end are used as the neutral points. Alternatively, the multiple coil ends at winding end may be used the power ends, and the multiple coil ends at winding start may be used as the neutral points.

In the above embodiments, at step 395, the coil end 52 is held on the press-fit block 383, and then the press-fit electrode 360 is press-fitted to the press-fit block 383 so as to come into contact with the coil end 52. Alternatively, the press-fit electrode 360 may be held on the press-fit block 383, and then the coil end 52 may be press-fitted to the holding surface 360d from the guide surface 360e of the press-fit electrode 360 so as to come into contact with the press-fit electrode 360. In this case, for example, the press-fit electrode 360 may be insert-molded on the press-fit block 383.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:
1. A rotary electric machine comprising
   a plurality of magnetic poles to which a coil is attached, wherein
   a connection portion between a conductive member and a coil end of the coil is arranged in an inter-pole gap between the plurality of magnetic poles.

2. The rotary electric machine according to claim 1, comprising
a rotor and a stator, wherein
the plurality of magnetic poles are magnetic poles of the stator.

3. The rotary electric machine according to claim 2, wherein
the rotor is arranged radially outward of a rotary body, and
the stator is arranged further radially outward of the rotor.

4. The rotary electric machine according to claim 1, wherein
the conductive member includes a plurality of power end members,
the connection portion is one of a plurality of connection portions,
each of the plurality of power end members has at least one of the plurality of connection portions,
the inter-pole gap is one of a plurality of inter-pole gaps defined by the plurality of magnetic poles, and
each of the plurality of connection portions is arranged in different one of the plurality of inter-pole gaps.

5. The rotary electric machine according to claim 1, wherein
the conductive member includes a neutral point member,
the connection portion is one of a plurality of connection portions of the neutral point member,
the inter-pole gap is one of a plurality of inter-pole gaps defined by the plurality of magnetic poles, and
each of the plurality of connection portions is arranged in different one of the plurality of inter-pole gaps.

6. The rotary electric machine according to claim 4, further comprising
a terminal block supporting the plurality of power end members.

7. The rotary electric machine according to claim 6, further comprising
the terminal block includes a connector portion that provides a connection between the plurality of power end members and an external circuit.

8. The rotary electric machine according to claim 4, wherein
the plurality of connection portions are dispersively arranged in the plurality of inter-pole gaps which are next to each other.

9. The rotary electric machine according to claim 1, wherein
the plurality of magnetic poles include an insulator as a bobbin, and
the conductive member is arranged within a height of the insulator in an axial direction of the rotary electric machine.

10. The rotary electric machine according to claim 1, wherein
the plurality of magnetic poles protrude in a radial direction of the rotary electric machine from a yoke that extends in a circumferential direction of the rotary electric machine,
the conductive member includes:
a circumferential extending portion that extends in the circumferential direction along the yoke; and
a radial extending portion that extends in the radial direction from the circumferential extending portion, and an end of the radial extending portion reaches the inter-pole gap, and
the connection portion is formed on the end of the radial extending portion.

11. The rotary electric machine according to claim 1, wherein
the conductive member is a press-fit electrode press-fitted to the coil end, and
the rotary electric machine further comprises a press-fit block supporting the press-fit electrode.

12. The rotary electric machine according to claim 11, wherein
the press-fit electrode extends outward in an axial direction of the rotary electric machine from the inter-pole gap.

13. The rotary electric machine according to claim 11, wherein
a part of the press-fit electrode is located in the inter-pole gap and press-fitted to the coil end in the inter-pole gap.

14. The rotary electric machine according to claim 11, wherein
the press-fit electrode is one of a plurality of press-fit electrodes which are positioned radially with respect to a central axis of the rotary electric machine.

* * * * *